(12) United States Patent
Durham et al.

(10) Patent No.: US 7,463,638 B2
(45) Date of Patent: *Dec. 9, 2008

(54) UP-TREE TOPOLOGY TRACE FOR NETWORK ROUTE TRACING

(75) Inventors: David M. Durham, Hillsboro, OR (US); Russell J. Fenger, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 960 days.

This patent is subject to a terminal disclaimer.

(21) Appl. No.: 10/795,791

(22) Filed: Mar. 8, 2004

(65) Prior Publication Data

US 2004/0240396 A1    Dec. 2, 2004

Related U.S. Application Data

(63) Continuation of application No. 09/217,761, filed on Dec. 21, 1998, now Pat. No. 6,704,319.

(51) Int. Cl.
*H04L 12/28* (2006.01)
*G06F 15/16* (2006.01)

(52) U.S. Cl. .................... 370/408; 370/256; 709/252

(58) Field of Classification Search ......... 370/254–256, 370/408, 229–238; 709/220, 252, 238–244
See application file for complete search history.

(56) References Cited

U.S. PATENT DOCUMENTS

| | | | | |
|---|---|---|---|---|
| 4,464,650 A | 8/1984 | Eastman et al. | ............ | 340/347 |
| 4,987,536 A | 1/1991 | Humblet | ............ | 364/200 |
| 5,233,604 A * | 8/1993 | Ahmadi et al. | ............ | 370/238 |
| 5,428,636 A | 6/1995 | Meier | ............ | 375/202 |
| 5,742,760 A | 4/1998 | Picazo, Jr. et al. | ...... | 395/200.02 |
| 5,790,858 A | 8/1998 | Vogel | ............ | 395/704 |
| 5,872,773 A | 2/1999 | Katzela et al. | ............ | 370/256 |
| 5,884,037 A * | 3/1999 | Aras et al. | ............ | 709/226 |
| 5,926,463 A | 7/1999 | Ahearn | ............ | 370/254 |
| 6,094,682 A | 7/2000 | Nagasawa | ............ | 709/224 |
| 6,101,550 A | 8/2000 | Zucker | ............ | 709/241 |
| 6,167,438 A | 12/2000 | Yates et al. | ............ | 709/216 |

(Continued)

*Primary Examiner*—Chi H. Pham
*Assistant Examiner*—Tri H. Phan
(74) *Attorney, Agent, or Firm*—Schwegman, Lundberg & Woessner, P.A.

(57) ABSTRACT

A network route tracing system traces a path through a network and identifies network components and communications links affected by the path. According to one embodiment of the present invention, a route is traced between two hosts in a network. The network is represented as a logical tree having a plurality of nodes. Each one of the nodes corresponds to a component in the network and each non-root node has a parent node. Two nodes are identified in the logical tree. A first node corresponds to a first host and a second node corresponds to a second host. If one of the two nodes exists at a lower level of the logical tree, then a first path is traced from the first node at the lower level to the parent node at a higher level until the parent node is at a same level of the logical tree as the second node. The first path is further traced up the logical tree from the parent node and a second path is traced up the logical tree from the second node until the first path and the second path meet at a same node.

6 Claims, 8 Drawing Sheets

U.S. PATENT DOCUMENTS 6,229,791 B1    5/2001   Nusekabel et al. .......... 370/252
6,347,078 B1 *  2/2002   Narvaez-Guarnieri et al. .... 370/230
6,538,997 B1    3/2003   Wang et al. ................. 370/241

* cited by examiner

UP-TREE TOPOLOGY TRACE FOR NETWORK ROUTE TRACING

This application is a continuation of U.S. patent application Ser. No. 09/217,761, filed Dec. 21, 1998, now issued as U.S. Pat. No. 6,704,319, which is incorporated herein by reference.

FIELD OF THE INVENTION

The present invention is related to computer networks, and more particularly to network route tracing.

BACKGROUND INFORMATION

A computer network consists of communications links that interconnect various components. A communications link is a communications channel or transmission medium. Components of the network include computers (also called hosts) and devices such as routers, hubs, switches, and the like which connect network segments and forward data transmissions.

Bandwidth refers to the amount of data that can be sent through the network. Bandwidth is usually measured in bits per second (bps). A computer network has a finite amount of bandwidth and thus the amount of data being sent through the network depends on the amount of available bandwidth. If computers on a network attempt transmissions requiring too much bandwidth, the network may fail to support one or more of the computers.

To address this problem, previous systems either have allocated bandwidth for the entire network generally, or previous systems have added additional logic for managing bandwidth to the individual components on the network. However, these approaches have disadvantages. Systems that allocate bandwidth for the entire network fail to consider how that bandwidth will be used over individual links of the network. Adding additional logic for managing bandwidth to the individual components on the network requires additional hardware in each component of the network.

For these and other reasons, there is a need for the present invention.

SUMMARY OF THE INVENTION

According to one embodiment of the present invention, a route is traced between two hosts in a network. The network is represented as a logical tree having a plurality of nodes. Each one of the nodes corresponds to a component in the network and each non-root node has a parent node. Two nodes are identified in the logical tree. A first node corresponds to a first host and a second node corresponds to a second host. If one of the two nodes exists at a lower level of the logical tree, then a first path is traced from the first node at the lower level to the parent node at a higher level until the parent node is at a same level of the logical tree as the second node. The first path is further traced up the logical tree from the parent node and a second path is traced up the logical tree from the second node until the first path and the second path meet at a same node.

DETAILED DESCRIPTION OF THE INVENTION

The present invention provides a network route tracing system which uses a logical tree to trace a path through a network and to identify network components and communications links affected by the path. In the following detailed description of the preferred embodiments, reference is made to the accompanying drawings which form a part hereof, and in which is shown by way of illustration specific embodiments in which the invention may be practiced. It is to be understood that other embodiments may be used and structural changes may be made without departing from the scope of the present invention.

Figure 1:
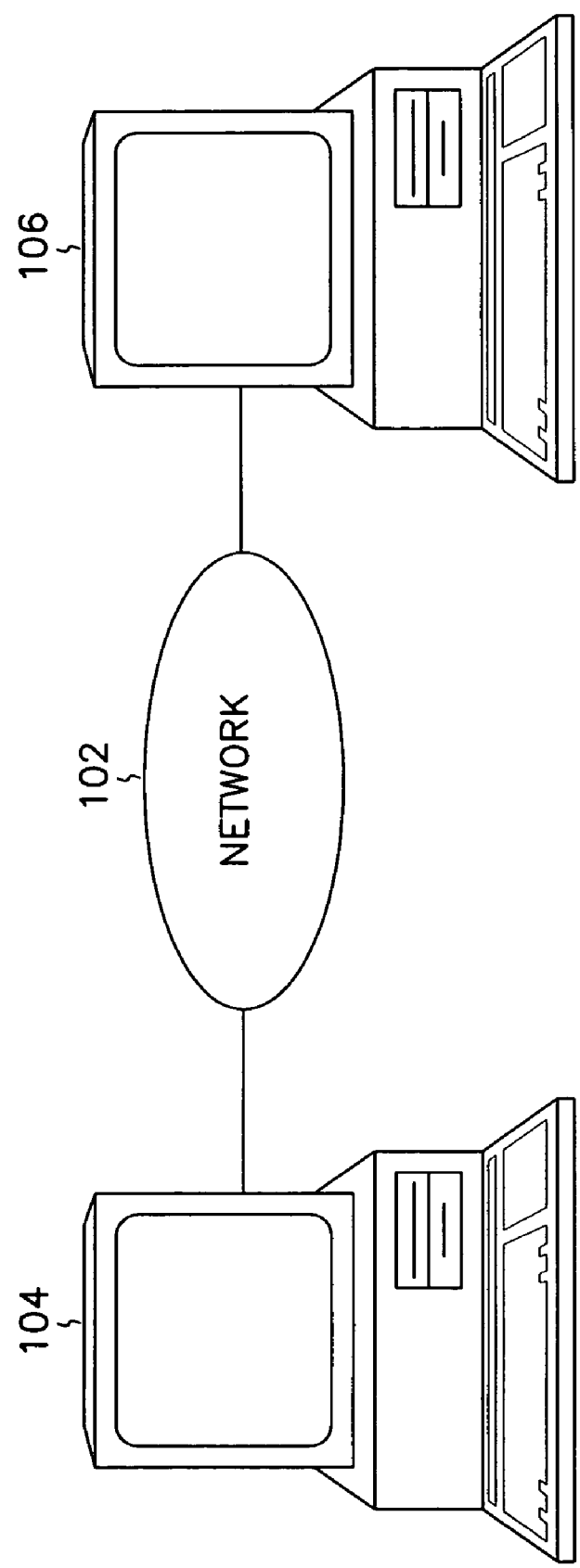
FIG. 1 is a diagram of a typical hardware and operating environment in conjunction with which embodiments of the invention may be implemented.

FIG. 1 is a diagram of a computerized system in conjunction with which embodiments of the invention may be implemented. The computerized system of FIG. 1 comprises one or more computers, such as computer 104, attached to a network 102.

Generally a computer, such as computer 104, comprises a bus for communicating information, a central processor coupled with the bus for processing information and executing instructions, a random access memory coupled with the bus for storing information and instructions for the central processor, and a read-only memory coupled with the bus for storing static information and instructions for the processor. The computer 104 also comprises a data storage device, such as a magnetic disk or optical disk drive, which may be communicatively coupled with the bus for storing data and instructions. A display device utilized with the computer 104 may be a liquid crystal device, cathode ray tube, or other display device suitable for creating graphic images and/or alphanumeric characters recognizable to a user. The computer system may also contain an alphanumeric input device including alphanumeric and function keys coupled to the bus for communicating information and command selections to the central processor, and a cursor control device coupled to the bus for communicating user input information and command selections to the central processor based on a user's hand movement. Many implementations of the cursor control device are known in the art, including a track ball, mouse, joystick or special keys on the alphanumeric input device, all capable of signaling movement in a given direction or manner of displacement. The computer 104 of FIG. 1 also contains an input/output device coupled to the bus for communicating information to and from the computer 104.

The computer 104 operates in a networked environment. A network, such as the network 102, connects the computer 104 to one or more remote computers, such as remote computer 106. The network 102 depicted in FIG. 1 comprises, for example, a local-area network (LAN) or a wide-area network (WAN). Such networking environments are common in offices, enterprise-wide computer networks, intranets, and the Internet. Those skilled in the art will recognize, however, that other comparable networks may be employed without diverting from the scope of the present invention. Any network that can be logically represented as a tree is contemplated as within the scope of the invention.

Figure 5A:
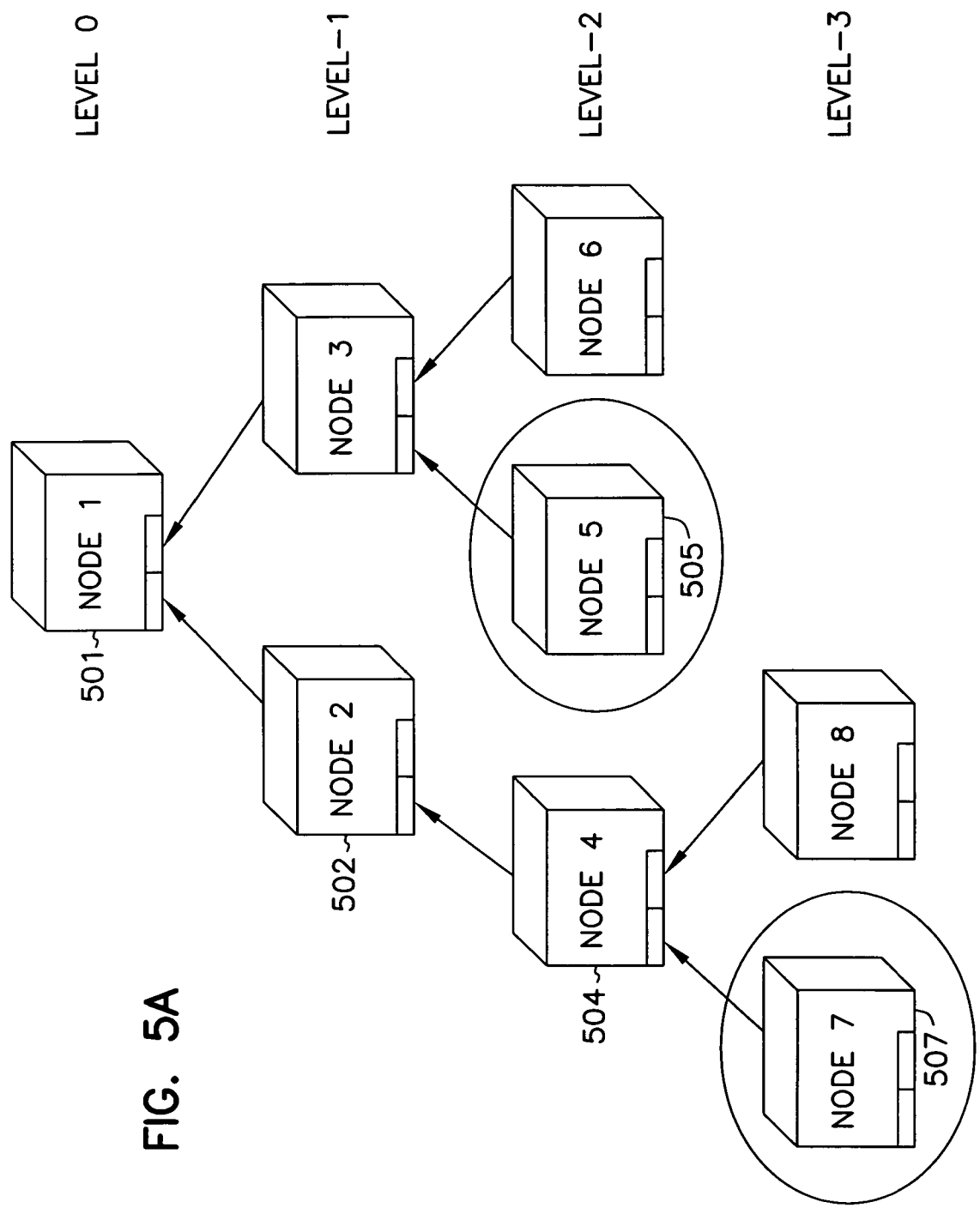
FIGS. 5A, 5B, 5C, and 5D illustrate an example using the method of tracing a network route shown in FIG. 4.

FIG. 5A is an example of a logical tree representing a network. A tree is a graph in which there is only one route between any pair of nodes. A node refers to a point in the graph where two or more lines meet. Each node in the graph corresponds to a component in a physical network such as the network 102. The top of a tree is called a root node. According to the present invention, a logical tree representing a network has the constraint that no node can have more than one parent node. The term "moving up the tree" means in the direction of the root node and the term "moving down the tree" means away from the root node.

Any commonly available algorithm for representing a network as a logical tree structure can be used. In an example embodiment, a spanning tree algorithm is used. The spanning tree algorithm is commonly used to produce logical trees representing a switched or bridged local area Ethernet network. The spanning tree removes redundant data links in the network and thus allows a fully interconnected network can be represented as a logical tree. Links in the spanning tree are the only paths through which data actually flows (even though additional physical links may exist). Nevertheless, all physical components remain connected in the network even though redundant links are removed in the logical tree.

Figure 2:
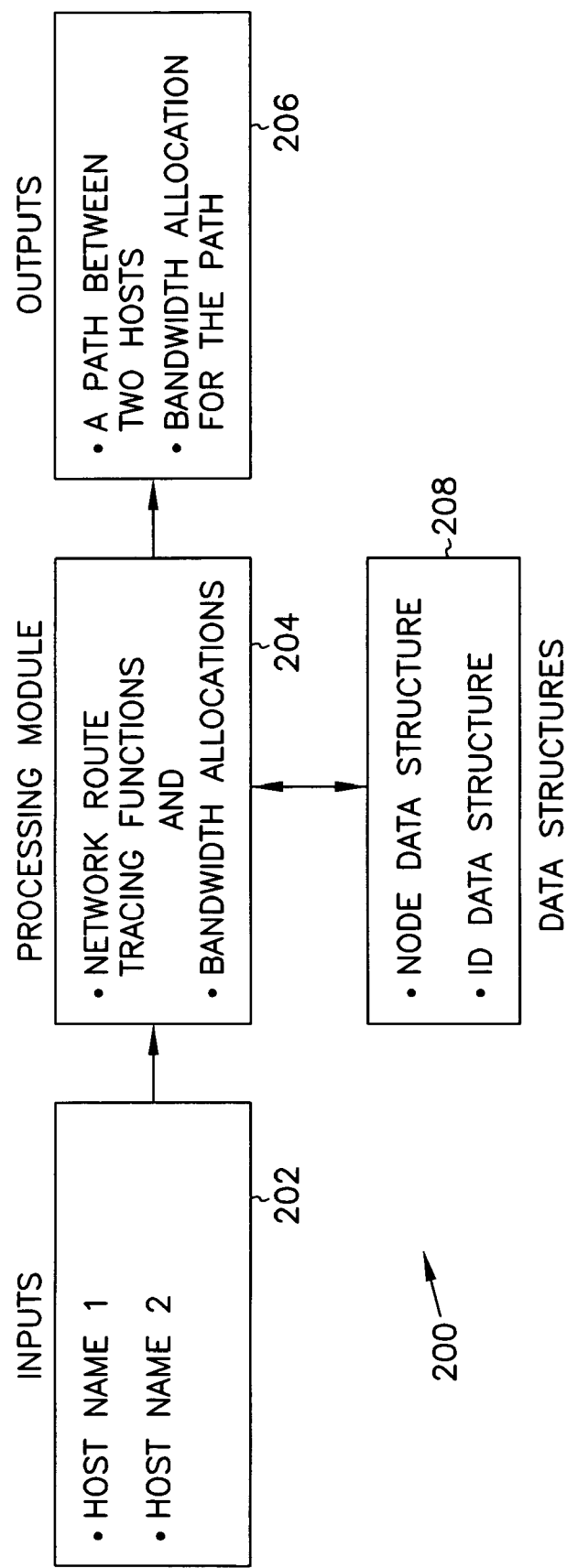
FIG. 2 is a block diagram of one embodiment of a network route tracing system of the present invention.

A system level overview of the operation of an example embodiment of the invention is described by reference to FIG. 2. A network route tracing system 200, as shown in FIG. 2, comprises one or more inputs 202, a processing module 204, one or more outputs 206, and one or more data structures 208.

The inputs 202 to the network route tracing system 200 represent a network name and/or network address for two hosts on the network. A host is a computer or device connected to a network. The two hosts are capable of communicating with each other over the network. The processing module 204 of the network route tracing system 200 uses a logical tree to identify one or more links in the network forming a route between the two hosts.

Processing module 204 comprises program modules that perform functions. Generally, program modules include routines, programs, objects, components, data structures, etc., that perform particular functions or implement particular abstract data types. The processing module 204 comprises program modules for performing network route tracing functions using a logical tree. The network route tracing functions trace a path between two components in an interconnected network. In one embodiment, the processing module 204 allocates bandwidth capacity for each link in the path traced between the two nodes. In an alternate embodiment, a security check is employed in conjunction with the network route tracing functions. For example, the security check identifies network security implications associated with the links in the path. In another embodiment, network management functions are performed by contacting the physical components along the path. For example, using Simple Network Management Protocol (SNMP) the physical components along the path are contacted and bandwidth resources are allocated at each component. In still another embodiment, monitoring and/or accounting functions are performed in conjunction with the network route tracing functions. For example, monitoring may be employed using SNMP to determine if a host's transmissions are operating within or exceeding an allocated amount of bandwidth for the links in the path. Those skilled in the art will recognize; however, that other processing activities may be employed in conjunction with the network route tracing functions without diverting from the scope of the present invention.

Output 206 represents a result produced by the processing module 204 in response to the input 202. An example output is a path for communications between the two hosts through the network. Another example output is a report that includes the bandwidth allocation of network links for a particular network route. Additional outputs 206 will be apparent from the description below.

Data structures 208 are used by the processing module 204. In one embodiment, the data structures 208 comprise a node data structure and an ID data structure. The node data structure contains the logical tree representation of the network. The node data structure is also referred to as an "up-tree." Each entry in the node data structure represents a component in the network and is referred to as a node. Thus, the node data structure, or up-tree, represents a plurality of components on the network in a tree-like data structure. The ID data structure is a mapping structure used to determine the beginning point in the up-tree for the network route tracing functions. An example entry in the node data structure and an example entry in the ID data structure are further described below.

Figure 3A:
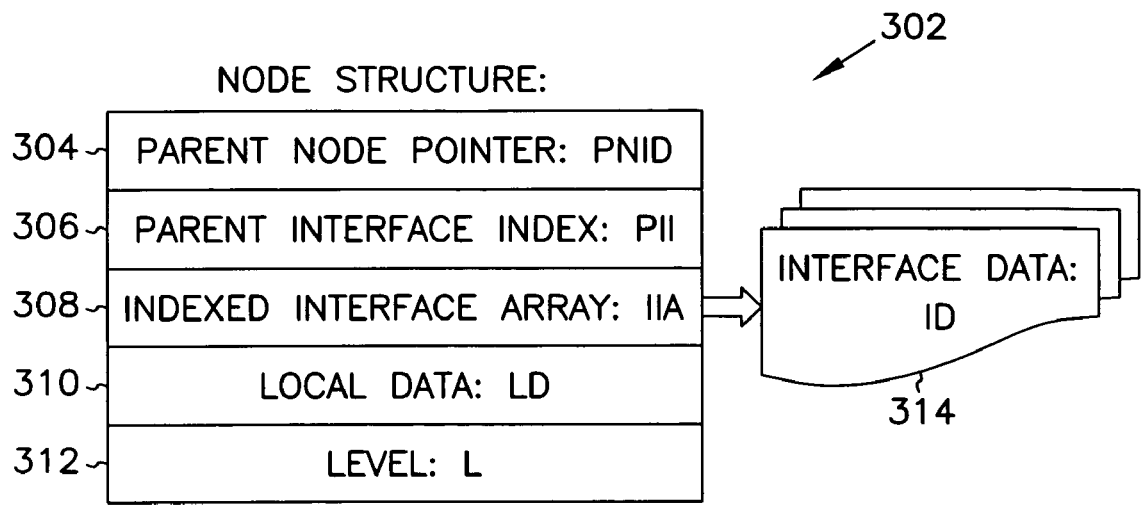
FIGS. 3A and 3B are block diagrams of example embodiments of entries in the data structures of FIG. 2.

FIG. 3A is a block diagram of an example embodiment of an entry in the node data structure 302, also called the up-tree. The entry 302 represents a component on the network. The example entry 302 comprises a parent node pointer (PNID) 304, a parent interface index (PII) 306, an indexed interface array (IIA) 308, local data (LD) 310, and a level (L) 312. The parent node pointer 304 is a pointer to a parent node in the logical tree representation of the network. Each node has a single parent node pointer. The parent interface index (PII) 306 identifies a particular interface on a physical component corresponding to the parent node. The indexed interface array (IIA) 308 is an array corresponding to the number of ports or interfaces on the component. The IIA 308 stores an identifier for each port or interface. The identifier is used to identify interface data (ID) 314. For example, if the component is a switch, then the component has multiple ports and the IIA 308 stores an identifier for each port. The local data 310 is used for selected processing during a path trace. In one embodiment, the local data 310 is used to determine how much bandwidth is being consumed on each link along a path in the network. The level 312 indicates the level of the node in the logical tree. In one embodiment, the root node of the tree is referred to as level zero.

Figure 3B:
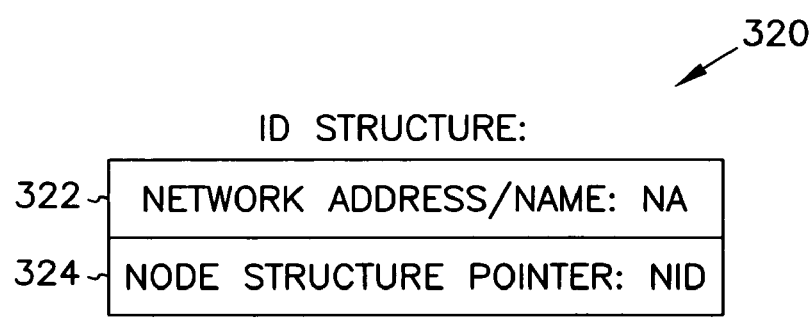

FIG. 3B is an example embodiment of an entry in the ID data structure 320. The ID entry 320 is used to identify a beginning entry in the up-tree for the route trace process. The ID entry 320 comprises a network address and/or network name 322 and a node structure pointer 324. The ID entry 320 associates a physical network address and/or network name 322 for a component of the network with a logical node structure pointer 324. The logical node structure pointer 324 identifies an entry in the up-tree corresponding to each of the physical network addresses and/or network names.

In one embodiment, both the node data structure and the ID data structure maintain entries, such as entries 302 and 320, in an array. Alternate embodiments implementing the node data structure entries and the ID data structure entries as a linked list or other well known data structures are contemplated as within the scope of the invention.

Figure 4:
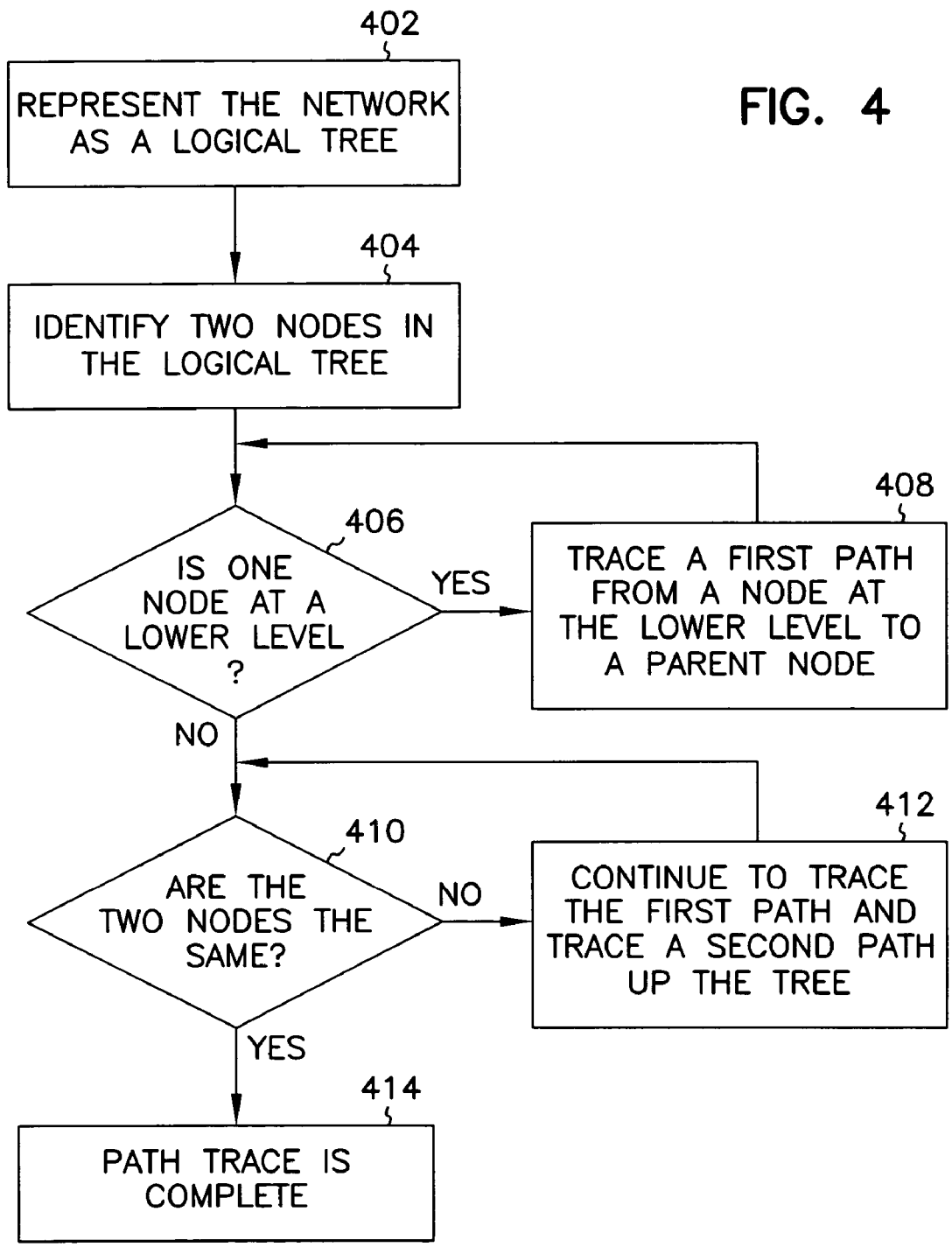
FIG. 4 is a flowchart of an example embodiment of a method of tracing a network route.

Referring now to FIG. 4, a particular method performed by a processor in an exemplary embodiment is described by reference to a flowchart. The method to be performed constitutes computer programs made up of computer-executable instructions. The method shown in FIG. 4 is implemented in a machine readable medium comprising machine readable instructions for causing a computer to perform the method. Such machine readable medium may include software modules and computer programs. The computer programs comprise multiple modules or objects to perform the methods, or the functions of the modules in the network route tracing system of FIG. 2. The type of computer programming languages used to write the code may vary from procedural code type languages to object oriented languages. The files or objects need not have a one to one correspondence to the modules or method acts described depending on the desires of the programmer. Further, the method and apparatus may comprise combinations of software, hardware and firmware as is well known to those skilled in the art. Describing the methods by reference to flowcharts enables one skilled in the art to develop such programs including such instructions to carry out the methods on suitable computerized systems.

FIG. 4 is a flow chart of the process to trace a route between two hosts in a network using a logical tree according to one embodiment of the network route tracing system of FIG. 2. As shown in FIG. 4, the network is represented as a logical tree having a plurality of nodes (block 402). Each of the nodes corresponds to a component in the network and each non-root node has a single parent node. Two nodes in the logical tree are identified (block 404). A first node corresponds to a first host in the network and a second node corresponding to a second host on the network. The two nodes are examined to detect if one of the two nodes exists at a lower level of the logical tree (block 406). If the two nodes are not on the same level of the logical tree, then one of the two nodes exists at a lower level and a first path is traced from the node at the lower level to the parent node at a higher level (block 408). The process in blocks 406 and 408 is repeated until a parent node along the first path is at a same level of the logical tree as the second node. The parent node and the second node are examined to determine if the parent node on the first path and the second node are the same node (block 410). If they are not the same node, then the first path is continued from the parent node up the logical tree and a second path is traced up the logical tree from the second node (block 412). The process in blocks 410 and 412 is repeated until the first path and the second path meet at a same node. When the first path and the second path meet a the same node, the process of tracing a route between two hosts in a network is complete (block 414).

FIGS. 5A, 5B, 5C, and 5D illustrate an example using the method of tracing a network route shown in FIG. 4. In the example embodiment in FIG. 5A, a network is represented as a logical tree having a plurality of nodes identified as node "1" through node "8." Each of the nodes corresponds to a component in the network and each non-root node has a single parent node. For example, node one 501 is the root node. Node two 502 has a single parent which is node one 501. Node four 504 has a single parent which is node two 502. Node seven 507 has a single parent which is node four 504 and so on. More specifically, node seven 507 points to a first interface of node four 504 while a second interface of node four 504 is pointed to by node eight. In the example embodiment, the root node is referred to as "level 0." The children of the root node are at "level –1" and so on. "Level –1" as used herein is a lower level in the logical tree than "level 0." Likewise, "Level –1" is a higher level in the logical tree than "level –2."

In the example embodiment, node seven 507 and node five 505 in the logical tree are identified as corresponding to the two hosts between which a network route is being traced. The two nodes 507, 505 are examined to detect if the two nodes 507, 505 exist on the same level or if one of the two nodes exists on a lower level of the logical tree. As shown in FIG. 5A, node seven 507 exists on "level –3" which is a lower level in the logical tree than node five 505 that exists on "level –2."

Since node seven 507 is on a lower level than node five 505, a first path is traced to the parent node of node seven 507, thus, moving up the tree.

Figure 5B:
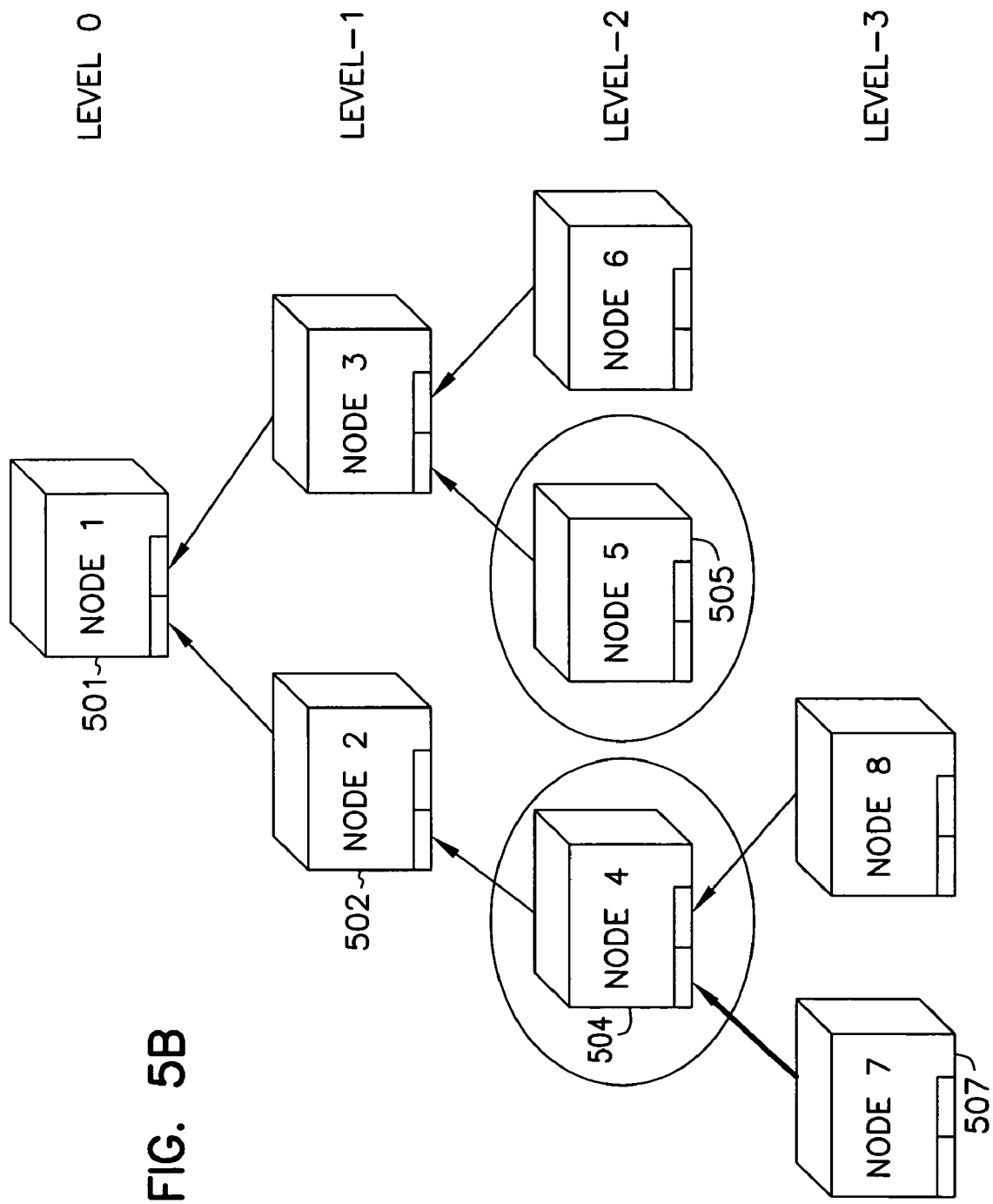

As shown in FIG. 5B, node four 504 is the parent node of node seven 507. A first path is followed from node seven 507 to node four 504 and is shown by a bold arrow. In one embodiment, operations are performed on data associated with the parent node four 504 such as deducting available bandwidth from the connection interface to node four 504. As shown in FIG. 5B, the parent node four 504 and node five 505 are on the same level. The level is "level –2." The parent node four 504 and node five 505 are checked to see if they represent the same host. Because they do not represent the same host and thus are not the same node, both the parent node four 504 and node five 505 are moved up the tree a level. In one embodiment, operations are performed on data associated with the parent nodes of node four 504 and node five 505 such as deducting available bandwidth from the corresponding connection interface.

Figure 5C:
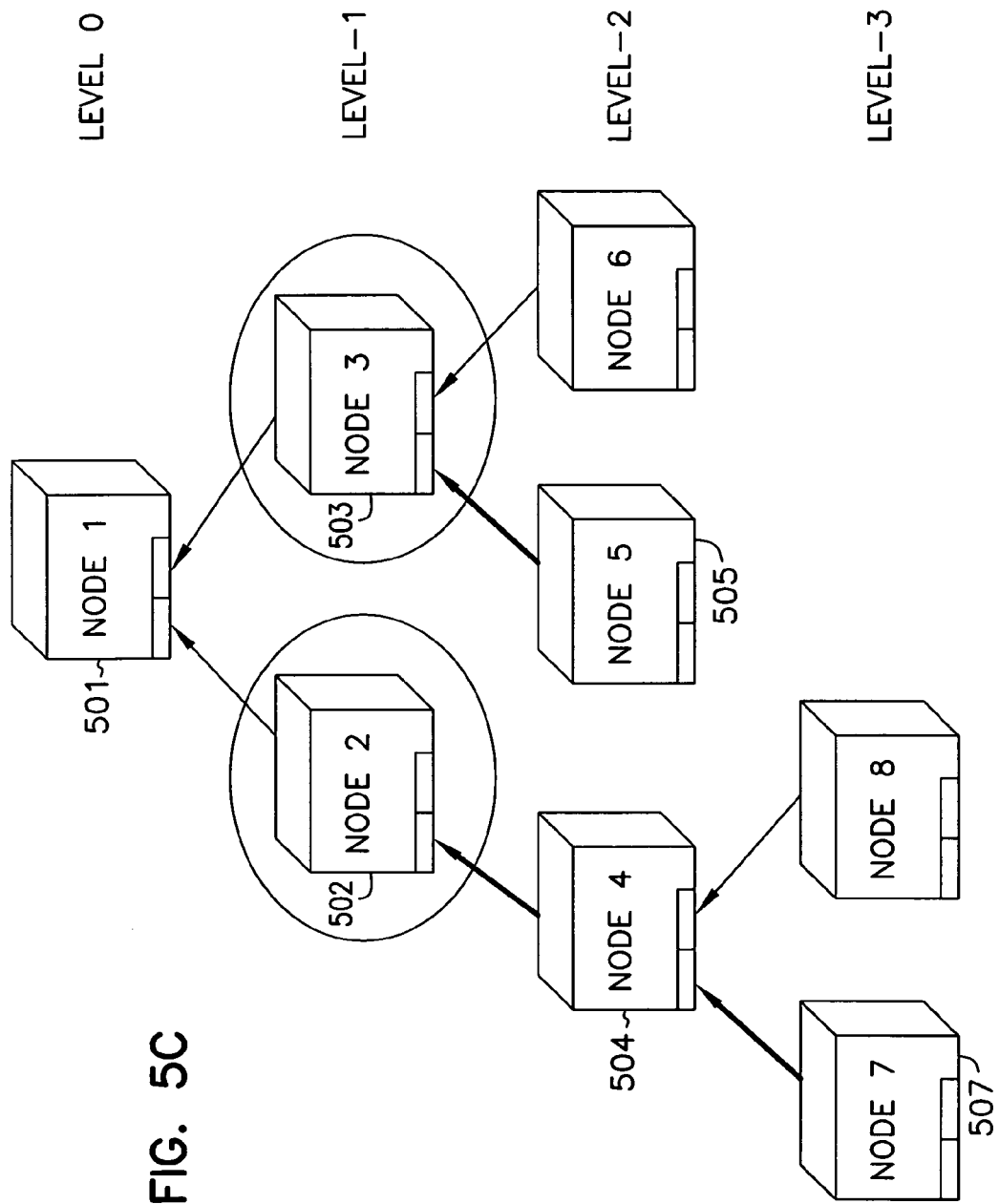

As shown in FIG. 5C, the first path is further followed from node four 504 to node two 502 and is shown by a bold arrow. A second path is followed from node five 505 to node three 503 and is also shown by a bold arrow. Again, node two 502 and node three 503 are on the same level and the two nodes 502, 504 are checked to see if they represent the same host. Again they do not represent the same host and thus are not the same node. Both node two 502 and node three 503 are followed up the tree to their parent node.

Figure 5D:
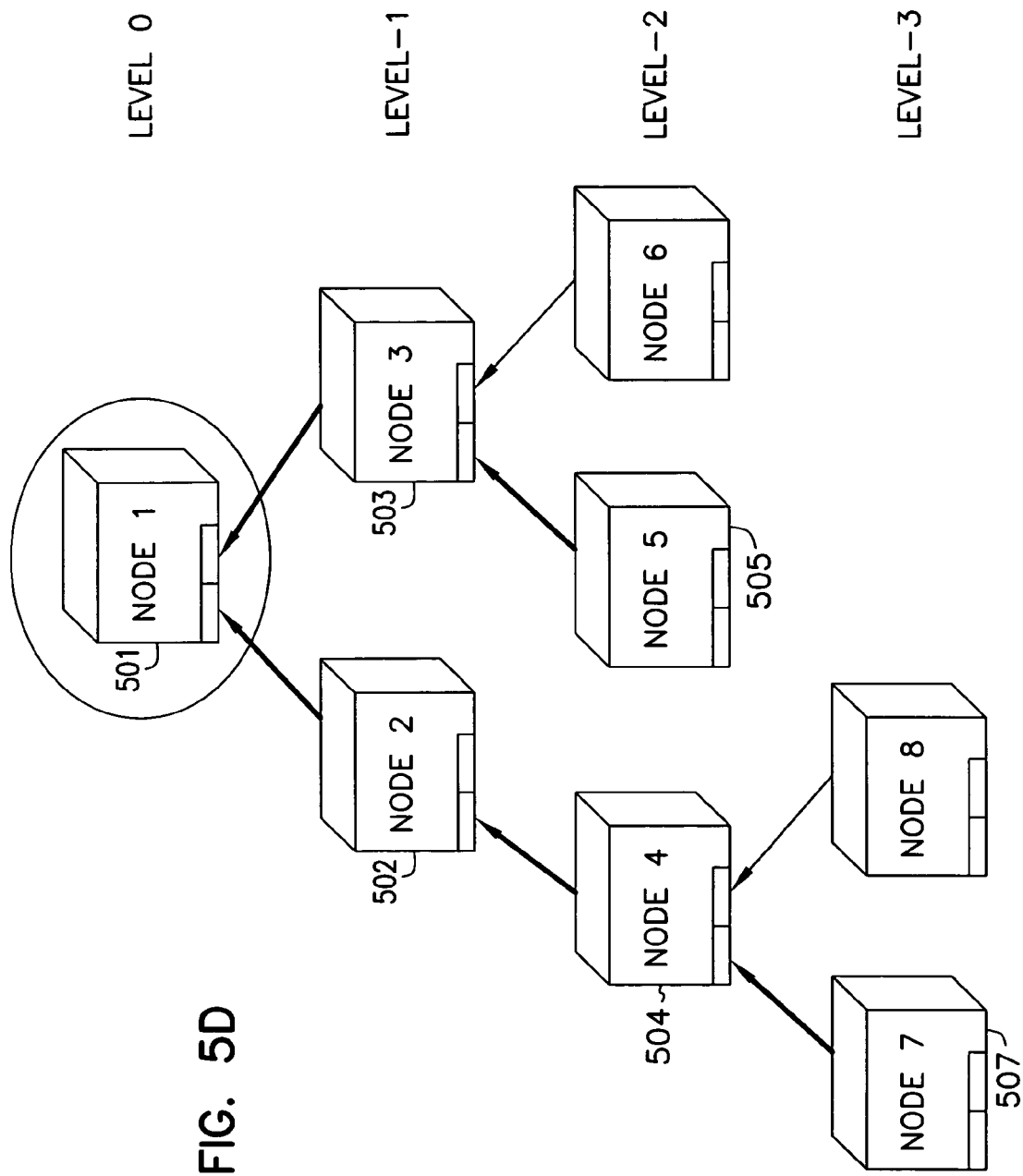

As shown in FIG. 5D, the first path is further followed from node two 502 to node one 501 and is shown by a bold arrow. Also, the second path is further followed from node three 503 to node one 501 and is also shown by a bold arrow. Here, node one 501 is the root node. Thus, the first path and the second path have been traced to the same node on the same level (that is node one 501 on "level 0") and the path trace is complete. The bold arrows show the path between the two nodes in the logical tree. Because the nodes correspond to components in the network, the route between two hosts in a network has been identified.

In an example embodiment in which the processing operations allocate or deallocate bandwidth, the method of tracing the route described above provides a centralized bandwidth manager with information to determine if an amount of bandwidth requested by a host is available. In an example embodiment in which the network is a LAN, the centralized bandwidth manager identifies all of the links or segments of the network that are affected by data flowing between two hosts on the network. The centralized bandwidth manager is useful in a variety of well known LAN topologies including, but not limited to, legacy switched, bridged, or segmented LANS. The method of tracing the route will also provide information for the centralized bandwidth manger to determine if there are enough bandwidth resources available for requests by other hosts.

In an alternate embodiment, a server is capable of tracing a path between layer-2 Ethernet switches in a LAN. In this embodiment, the physical components of the network, including switches, hosts and routers, are represented as nodes in an up-tree data structure. Since the up-tree is easily stored in contiguous memory, the up-tree is highly efficient for use with a cache-based computer architecture. An array maps the physical component to the corresponding node in the up-tree. A percentage of the bandwidth resources are deducted or added for each node along the path. Such a server manages bandwidth resource reservations made across Ethernet switches in a LAN.

The method of the present invention allows a bandwidth manager or server to identify the bandwidth allocations for each link of a network without requiring additional hardware to be added to the network components.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method comprising:
   representing a network as a logical tree having a plurality of nodes, each one of the nodes corresponding to a component in the network and each non-root node having a parent node;
   identifying two nodes in the logical tree, a first node corresponding to a first host in the network and a second node corresponding to a second host in the network;
   detecting if one of the two nodes exists at a lower level of the logical tree;
   tracing a first path from the first node at the lower level to the parent node at a higher level until the parent node is at a same level of the logical tree as the second node; and
   continuing to trace the first path up the logical tree from the parent node and tracing a second path up the logical tree from the second node until the first path and the second path meet at a same node.

2. The method of claim 1, further comprising performing an operation on data corresponding to each one of the nodes in both paths traced up the logical tree.

3. The method of claim 2, wherein the operation performed comprises managing bandwidth for a link in the network.

4. A computer readable medium having computer instructions which are executed by a processor for performing a method comprising:
   representing a network as a logical tree having a plurality of nodes, each one of the nodes corresponding to a component in the network and each non-root node having a parent node;
   identifying two nodes in the logical tree, a first node corresponding to a first host in the network and a second node corresponding to a second host in the network;
   detecting if one of the two nodes exists at a lower level of the logical tree;
   tracing a first path from the first node at the lower level to a parent node at a higher level until the parent node is at a same level of the logical tree as the second node; and
   continuing to trace the first path up the logical tree from the parent node and tracing a second path up the logical tree from the second node until the first path and the second path meet at a same node.

5. The computer readable medium of claim 4, further comprising computer-executable instructions for performing an operation on data corresponding to each one of the nodes in both paths traced up the logical tree.

6. The computer readable medium of claim 5, wherein the operation performed comprises managing bandwidth for a link in the network.

* * * * *

UNITED STATES PATENT AND TRADEMARK OFFICE
CERTIFICATE OF CORRECTION

| | | |
|---|---|---|
| PATENT NO. | : 7,463,638 B2 | Page 1 of 1 |
| APPLICATION NO. | : 10/795791 | |
| DATED | : December 9, 2008 | |
| INVENTOR(S) | : Durham et al. | |

It is certified that error appears in the above-identified patent and that said Letters Patent is hereby corrected as shown below:

On the Title Page, Item (57), under "Abstract", line 2, delete "identifiesnetwork" and insert -- identifies network --, therefor.

Signed and Sealed this

Tenth Day of February, 2009

JOHN DOLL
*Acting Director of the United States Patent and Trademark Office*